United States Patent
Min et al.

(10) Patent No.: US 8,928,907 B2
(45) Date of Patent: Jan. 6, 2015

(54) METHOD OF SENSING CONNECTION OF USB DEVICE IN POWER SAVE MODE AND IMAGE FORMING APPARATUS FOR PERFORMING THE SAME

(71) Applicant: Samsung Electronics Co., Ltd., Suwon-si, Gyeonggi-do (KR)

(72) Inventors: Byung-sun Min, Gyeonggi-do (KR); Si-nae Choi, Seoul (KR)

(73) Assignee: Samsung Electronics Co., Ltd., Suwon-Si (KE)

( * ) Notice: Subject to any disclaimer, the term of this patent is extended or adjusted under 35 U.S.C. 154(b) by 0 days.

(21) Appl. No.: 13/938,390

(22) Filed: Jul. 10, 2013

(65) Prior Publication Data

US 2014/0153025 A1 Jun. 5, 2014

(30) Foreign Application Priority Data

Dec. 3, 2012 (KR) .................. 10-2012-0139261

(51) Int. Cl.
*G06F 15/00* (2006.01)
*G06F 1/32* (2006.01)

(52) U.S. Cl.
CPC ............ *G06F 1/3215* (2013.01); *G06F 1/3206* (2013.01); *G06F 1/3234* (2013.01); *Y02B 60/1267* (2013.01)
USPC ...................................................... 358/1.14

(58) Field of Classification Search
CPC .................................................... G06F 1/3278
USPC ............................................................ 358/1.14
See application file for complete search history.

(56) References Cited

U.S. PATENT DOCUMENTS

| 6,622,178 | B1 | 9/2003 | Burke et al. |
| 7,565,561 | B2 | 7/2009 | Yanagawa |
| 2006/0271802 | A1 | 11/2006 | Yanagawa |
| 2007/0263250 | A1* | 11/2007 | Koiwai ...................... 358/1.15 |

FOREIGN PATENT DOCUMENTS

| JP | 59-116053 | 7/1984 |
| JP | 4-295222 | 10/1992 |
| JP | 7-86843 | 3/1995 |
| JP | 2007-4783 | 1/2007 |
| JP | 4298721 | 4/2009 |

OTHER PUBLICATIONS

Extended European Search Report issued Feb. 14, 2014 in corresponding European Application No. 13176269.2.

* cited by examiner

*Primary Examiner* — Saeid Ebrahimi Dehkordy
(74) *Attorney, Agent, or Firm* — Staas & Halsey LLP (57) ABSTRACT

An image forming apparatus includes a main controller, a universal serial bus (USB) interface to which an external USB device is connected, a voltage bus (VBUS) power supply to supply power to the USB interface through the VBUS line, a voltage change detector to output a wake-up signal to the main controller if a voltage change occurs on the VBUS line, a USB host controller to perform data communication with the USB device connected through the USB interface, and an image forming job performing unit to perform an image forming job according to control by the main controller.

21 Claims, 6 Drawing Sheets

Table s3. Electrical Characteristics for Surface-mount Devices at 20°C — 701

| | | $I_H$ (A) | $I_T$ (A) | $V_{MAX}$ ($V_{DC}$) | $I_{MAX}$ (A) | $P_{DTYP}$ (W) | Max. (A) | Time-to-Trip (S) | $R_{MIN}$ Ω | $R_{TYP}$ Ω | $R_{1\,MAX}$ Ω |
|---|---|---|---|---|---|---|---|---|---|---|---|
| Part Number | | | | | | | | | | | |
| nanoSMD Size 3216 mm/1206 mils | | | | | | | | | | | |
| New | nanoSMDM012 | † | 0.125 | 0.29 | 30 | 10 | 0.4 | 1.0 | 0.20 | 1.50 | 4.5 | 6.000 |
| New | nanoSMDM016 | † | 0.16 | 0.37 | 30 | 10 | 0.4 | 1.0 | 0.30 | 1.20 | 3.5 | 4.500 |
| | nanoSMDM050 | † | 0.50 | 1.00 | 6 | 40 | 0.4 | 8.0 | 0.10 | 0.15 | 0.400 | 0.700 |
| New | nanoSMDM050F* | † | 0.50 | 1.00 | 6 | 40 | 0.4 | 8.0 | 0.10 | 0.15 | 0.400 | 0.700 |
| | nanoSMDM075 | † | 0.75 | 1.50 | 6 | 40 | 0.4 | 8.0 | 0.20 | 0.10 | 0.200 | 0.290 |
| New | nanoSMDM075F* | † | 0.75 | 1.50 | 6 | 40 | 0.4 | 8.0 | 0.20 | 0.10 | 0.200 | 0.290 |
| | nanoSMDM100 | † | 1.00 | 1.80 | 6 | 40 | 0.4 | 8.0 | 0.30 | 0.06 | 0.150 | 0.210 |
| New | nanoSMDM100F* | † | 1.00 | 1.80 | 6 | 40 | 0.4 | 8.0 | 0.30 | 0.06 | 0.150 | 0.210 |
| | nanoSMDMC150 | † | 1.50 | 3.00 | 6 | 40 | 0.6 | 8.0 | 1.00 | 0.04 | 0.080 | 0.110 |
| microSMD Size 3225 mm/1210 mils | | | | | | | | | | | |
| | microSMD005 | † | 0.05 | 0.15 | 30 | 10 | 0.6 | 0.25 | 1.5 | 3.60 | 25.00 | 50.000 |
| New | microSMD010 | † | 0.10 | 0.25 | 30 | 10 | 0.6 | 0.5 | 1.0 | 2.1 | 9.0 | 15.000 |
| | microSMD035 | † | 0.35 | 0.75 | 6 | 40 | 0.6 | 8.0 | 0.2 | 0.32 | 0.81 | 1.300 |
| | microSMD050 | † | 0.50 | 1.00 | 13.2 | 40 | 0.6 | 5.0 | 0.1 | 0.25 | 0.55 | 0.900 |
| | microSMD075 | † | 0.75 | 1.50 | 6 | 40 | 0.6 | 8.0 | 0.1 | 0.11 | 0.29 | 0.400 |
| | microSMD110 | † | 1.10 | 2.20 | 6 | 40 | 0.6 | 5.0 | 1.0 | 0.07 | 0.14 | 0.210 |
| | microSMD150 | † | 1.5 | 3.0 | 6 | 40 | 0.6 | 5.0 | 5.0 | 0.04 | 0.07 | 0.110 |

FIG. 8

| Symbol | Parameter | Conditions | Min | Type | Max | Units |
|---|---|---|---|---|---|---|
| STATIC PARAMETERS | | | | | | |
| BV$_{DSS}$ | Drain-Source Breakdown Voltage | I$_D$=-250μA, V$_{GS}$=0V | -30 | | | V |
| I$_{DSS}$ | Zerro Gate Voltage Drain Current | V$_D$=30V, V$_{GS}$=0V | | | -1 | μA |
| | | T$_J$=55°C | | | -5 | |
| I$_{GSS}$ | Gate-Body leakage current | V$_{DS}$=-0V, V$_{GS}$=±20V | | | ±100 | nA |
| V$_{GS(th)}$ | Gate Threshold Volage | V$_{DS}$=V$_{GS}$, I$_D$=-250μA | -1.4 | -1.9 | -3 | V |
| I$_{D(ON)}$ | On state drain current | V$_{GS}$=4.5V, V$_{DS}$=-5V | -5 | | | A |
| R$_{DS(ON)}$ | Static Drain-Source On-Resistance | V$_{GS}$=10V, I$_D$=2.6A | | 97 | 130 | mΩ |
| | | T$_J$=125°C | | 135 | 150 | |
| | | V$_{GS}$=4.5V, I$_D$=-2A | | 166 | 200 | mΩ |
| g$_{FS}$ | Fonward Transconductance | V$_{DS}$=5V, I$_D$=-2.5A | 3 | 3.8 | | S |
| V$_{SD}$ | Diode Forward Voltage | I$_S$=-1A, V$_{GS}$=0V | 3 | -0.82 | -1 | V |
| I$_S$ | Maximum Body-Diode Continuous Current | | | | -2 | A |

801

METHOD OF SENSING CONNECTION OF USB DEVICE IN POWER SAVE MODE AND IMAGE FORMING APPARATUS FOR PERFORMING THE SAME

CROSS-REFERENCE TO RELATED APPLICATIONS

This application claims the benefit of Korean Patent Application No. 10-2012-0139261, filed on Dec. 3, 2012, in the Korean Intellectual Property Office, the disclosure of which is incorporated herein in its entirety by reference.

BACKGROUND

1. Field

One or more embodiments relate to a method of sensing connection of a USB device by an image forming apparatus in a power save mode.

2. Description of the Related Art

Recently, as the concept of power saving has become increasingly important, methods of saving standby power of electric appliances are being introduced. In the case of an image forming apparatus, standby power may be saved by turning off some internal components of the image forming apparatus by entering a power save mode when an operation, such as printing, is not being performed.

Furthermore, a recent image forming apparatus may include a universal serial bus (USB) port, and may be connected to other external devices and transmit and receive data. In this regard, the image forming apparatus may include a USB device controller for controlling the image forming apparatus to operate as a USB device, and includes a USB host controller for controlling the image forming apparatus to operate as a USB host.

When the image forming apparatus operates as a USB device, the image forming apparatus is supplied power from a device that is connected to the image forming apparatus and operates as a USB host. Hence, when the image forming apparatus is in a power save mode, even though the USB device control is in an off state, if a device operating as a USB host is connected to the image forming apparatus, the supplied power may be sensed, and the USB device controller may be woken up.

However, when the image forming apparatus operates as a USB host, the image forming device supplies power to a device that is connected to the image forming apparatus and operates as a USB device, via a voltage bus (VBUS) line, and thus wake-up by power sensing is impossible. Hence, according to the conventional art, even if the image forming apparatus enters a power save mode, there is a limitation in saving standby power by using a method of maintaining an on state without turning off the USB host controller or by using a method of first turning off the USB host controller and then checking whether a USB device has been connected by periodically turning on the USB host controller.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments relate to a method of sensing connection of a universal serial bus (USB) device for saving standby power by an image forming apparatus in a power save mode, and an image forming apparatus for performing the same.

According to one or more embodiments, an image forming apparatus may include: a main controller; a universal serial bus (USB) interface to which an external USB device is connected; a voltage bus (VBUS) power supply to supply power to the USB interface through the VBUS line; a voltage change detector to output a wake-up signal to the main controller if a voltage change occurs on the VBUS line; a USB host controller to perform data communication with the USB device connected through the USB interface; and an image forming job performing unit to perform an image forming job according to control by the main controller, wherein the main controller turns off the USB host controller and the image forming job performing unit if the image forming apparatus enters a power save mode, and the main controller turns on the USB host controller if the wake-up signal is received from the voltage change detection unit.

The voltage change detector may include: a resistor on the VBUS line; and a comparator for outputting the wake-up signal if a voltage difference occurs between both ends of the resistor.

A voltage value of one end of the resistor may be input to a non-inverting input port of the comparator, and a voltage value of the other end of the resistor may be input to an inverting input port of the comparator.

The resistor may be implemented as a poly switch or a switching transistor.

The main controller may include: a general purpose input/output (GPIO) to manage an input and output of a signal; and a power save mode manager to manage a power supply when the image forming apparatus is in a power save mode, wherein the power save mode manager may turn off the USB host controller if the image forming apparatus enters the power save mode, and may turn on the USB host controller if a wake-up signal is received through the GPIO.

The power save mode manager may be a micro kernel operated when the image forming apparatus is in the power save mode.

The USB host controller may be located in the main controller.

The image forming apparatus may further include a USB hub to perform data communication with the USB host controller, wherein the USB hub may be located outside the main controller, wherein the main controller may block power supplied to the USB hub if the image forming apparatus enters the power save mode.

The USB host controller may be located outside the main controller, and the main controller may block power supplied to the USB controller if the image forming apparatus enters the power save mode.

According to one or more embodiments, a method of sensing connection of a universal serial bus (USB) device when an image forming apparatus is in a power save mode may include: turning off a USB host controller of the image forming apparatus as the image forming apparatus enters the power save mode; outputting a wake-up signal to a main controller of the image forming apparatus if a USB device is connected to a USB port of the image forming apparatus and a voltage change occurs on a voltage bus (VBUS) line that supplies power to the USB port; receiving the wake-up signal by the main controller; and turning on the USB host controller by the main controller.

The outputting of the wake-up signal may amplify a voltage difference between two ends of a resistor on the VBUS line, and may output the amplified voltage difference.

The resistor may be implemented as a poly switch or a switching transistor.

The main controller may operate a micro kernel if the image forming apparatus enters the power save mode, the receiving of the wake-up signal may include receiving the wake-up signal through a general purpose input/output (GPIO) of the main controller, and turning on the USB host controller turns on the USB host controller if the micro kernel receives the wake-up signal from the GPIO.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 1:
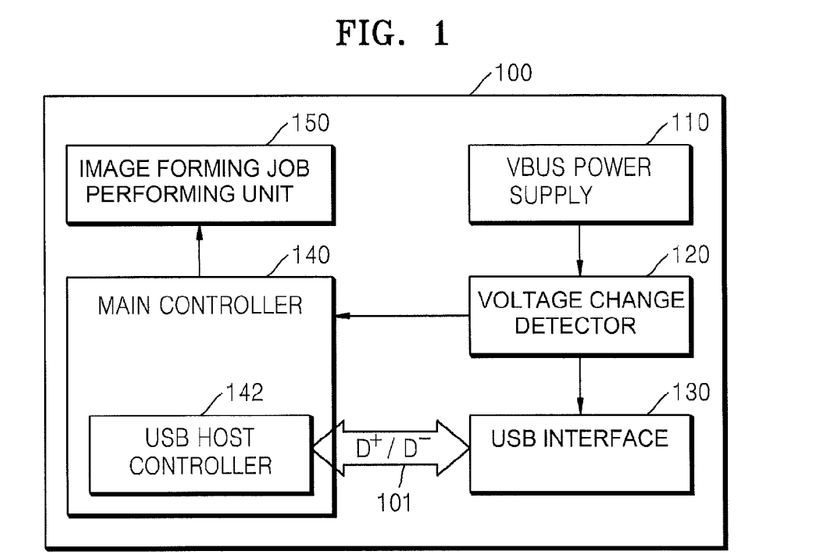
FIG. 1 is a view illustrating an internal configuration of an image forming apparatus according to one or more embodiments.

FIG. 1 is a view illustrating an internal configuration of an image forming apparatus 100 according to one or more embodiments. Referring to FIG. 1, the image forming apparatus may include a voltage bus (VBUS) power supply 110, a voltage change detector 120, a universal serial bus (USB) interface 130, a main controller 140, a USB host controller 142, and an image forming job performing unit 150.

The VBUS power supply 110 may supply VBUS power to the USB interface 130 via a VBUS line. The VBUS power supplied to the USB interface 130 may be used in operating a USB device connected to the USB interface 130 if the image forming apparatus 100 operates as a USB host. Hence, when there is no USB device connected to the USB interface 130, one end of the VBUS line may be in an opened state, and thus no voltage change may occur on the VBUS line. However, if there is a USB device connected to the USB interface 130, the VBUS power may be supplied to the USB device via the VBUS line, and thus if there is a resistor, etc. on the VBUS line, a voltage drop may occur.

The voltage change detector 120 may be provided on the VBUS line via which the VBUS power may be supplied from the VBUS power supply 110 to the USB interface 130. If the USB device is connected to the USB interface 130 and a voltage change occurs on the VBUS line, the voltage change detector 120 may output a wake-up signal to the main controller 140. The voltage change detector 120 for detecting a voltage change on the VBUS line will be described later in detail with reference to FIG. 2.

The USB interface 130 may allow the image forming apparatus 100 to be connected to the USB device. Specifically, the USB interface 130 may have a USB port for connection to the USB device. Furthermore, the USB interface 130 may be supplied VBUS power from the VBUS power supply 110, and may supply the power to the USB device connected to the USB port. The USB interface 130 may include a plurality of USB ports.

The main controller 140 may control overall operation of the image forming apparatus 100, and if the image forming apparatus 100 enters a power save mode, the main controller 140 may turn off internal components of the image forming apparatus 100 to save the standby power. Specifically, the main controller 140 may turn off components such as a print engine and a scanner included in the image forming job performing unit 150, and may also turn off sub-components that are included in the main controller 140 and perform various control operations. As more components are turned off, more standby power may be saved.

Furthermore, if a particular condition is satisfied, for example, if the image forming apparatus 100 does not perform any job for a certain period of time, the controller 140 may control the image forming apparatus 100 to enter the power save mode.

If a USB device is connected to the USB interface 130 and the image forming apparatus 100 operates as a USB host, the USB host controller 142 may perform data communication with the USB device via a USB data line 101. If the image forming apparatus 100 enters the power save mode, the USB host controller 142 may be turned off by the control of the main controller 140. Furthermore, in the power save mode, if the USB device is connected to the USB interface 130 and a voltage change is detected on the VBUS line, the USB host controller 142 may be turned on by the control of the main controller 140.

As illustrated in FIG. 1, the USB host controller 142 may be positioned inside the main controller 140, but may also be positioned outside the main controller 140. Furthermore, the USB host controller 142 may be positioned inside the main controller 140, and may perform data communication with the USB interface 130 via a USB hub provided outside the main controller 140, which will be described later in detail with reference to FIGS. 3 and 4.

The image forming job performing unit 150 may perform a specific image forming job such as printing and scanning, and may include, for example, a print engine and a scanner, etc. The image forming job performing unit 150 may perform an image forming job according to the control of the main controller 140, and, if the image forming apparatus 100 enters the power save mode, the image forming job performing unit 150 may be turned off by the control of the main controller 140.

A specific process, whereby the image forming apparatus 100 enters a power save mode, an external USB device is connected to the image forming apparatus 100, and the USB host controller 142 is woken up, will be described below.

If the image forming apparatus 100 performs no job for a certain period of time, the main controller 140 may determine that a condition for entering the power save mode is satisfied, and may turn off some components of the image forming apparatus 100. At this time, the image forming job performing unit 150 and the USB host controller 142 may be turned off. In a state where the image forming apparatus 100 is in a power save mode, if an external USB device is connected to the USB interface 130, the VBUS power output from the VBUS power supply 110 may be supplied to the connected USB device, and thus a voltage change may occur on the VBUS line. If a voltage change occurs on the VBUS line, the voltage change detector 120 may output a wake-up signal to the main controller 140. If the wake-up signal is received from the voltage change detector 120, the main controller 140 may turn on the USB host controller 142 to perform data communication with the USB device connected to the USB interface 130.

Likewise, if the image forming apparatus 100 enters a power save mode, the USB host controller 142 may be turned off. Furthermore, if the USB device is connected to the image forming apparatus 100 and a voltage change occurs on the VBUS line that supplies power to the USB interface 130, the voltage change may be detected and the USB host controller 142 may be turned on, thereby saving the standby power.

Figure 2:
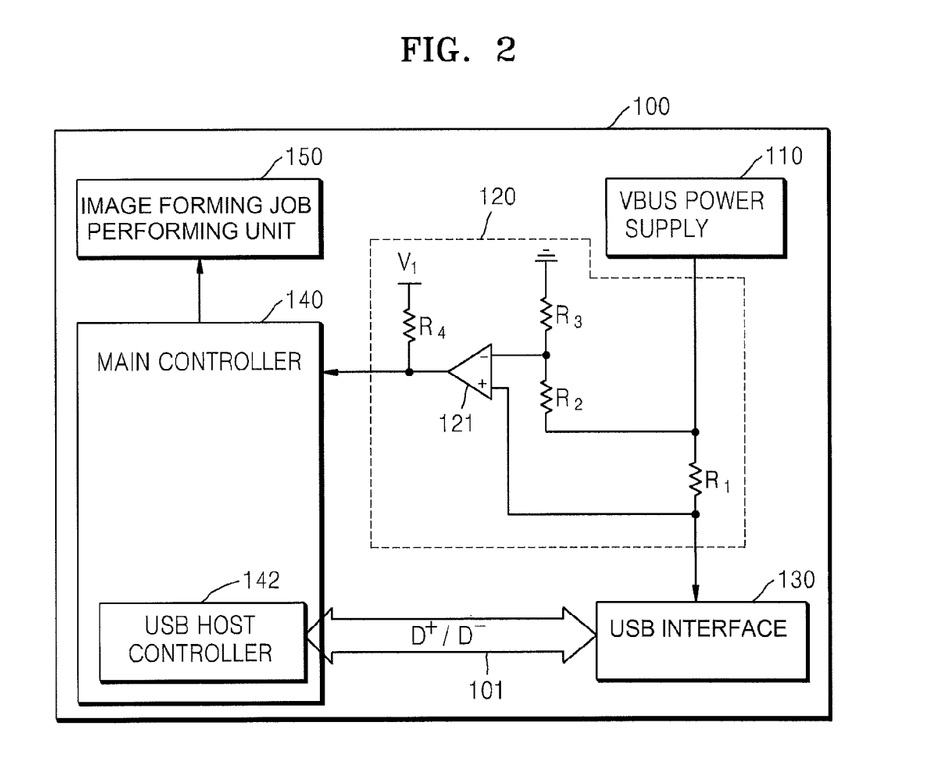
FIG. 2 is a view illustrating an internal configuration of an image forming apparatus according to one or more embodiments.

FIG. 2 is a view illustrating an internal configuration of an image forming apparatus according to one or more embodiments. FIG. 2 illustrates a specific configuration of a voltage change detector 120. Other components except for those included in this specific configuration of the voltage change detector 120 are the same as the image forming apparatus illustrated in FIG. 1, and thus the detailed description thereof will be omitted here.

Referring to FIG. 2, the voltage change detector 120 may include a comparator 121 and four resistors R1, R2, R3 and R4.

R1 may be provided on the VBUS line. Hence, if the USB device is connected to the USB interface 130 and VBUS power is supplied from the VBUS power supply 110 to the USB device, a voltage difference may be generated at both ends of R1. At this time, one end of R1 may be connected to a non-inverting input port of the comparator 121, the other end of R1 may be connected to one end of another resistor R2, the other end of R2 may be connected to an inverting input port of the comparator 121 and one end of R3, and the other end of R3 may be grounded.

Hence, the voltage value of one end of R1 may be voltage-divided by R2 and R3, and may be input to the inverting input port of the comparator 121. Furthermore, the voltage value of the other end of R1 may be input to the non-inverting input port of the comparator 121. The comparator 121 may amplify the difference between the input of the inverting input port and the input of the non-inverting input port, and may output the amplified difference. The comparator 121 may be controlled to output a signal having a certain value when a voltage drop occurs at both ends of R1 by appropriately adjusting the values of R2 and R3. If a voltage drop occurs at both ends of R1, a signal of a certain value output from the comparator 121 may be a wake-up signal, and the main controller 140 may turn on the USB host controller 142 in response to the wake-up signal output from the comparator 121.

Figure 7:
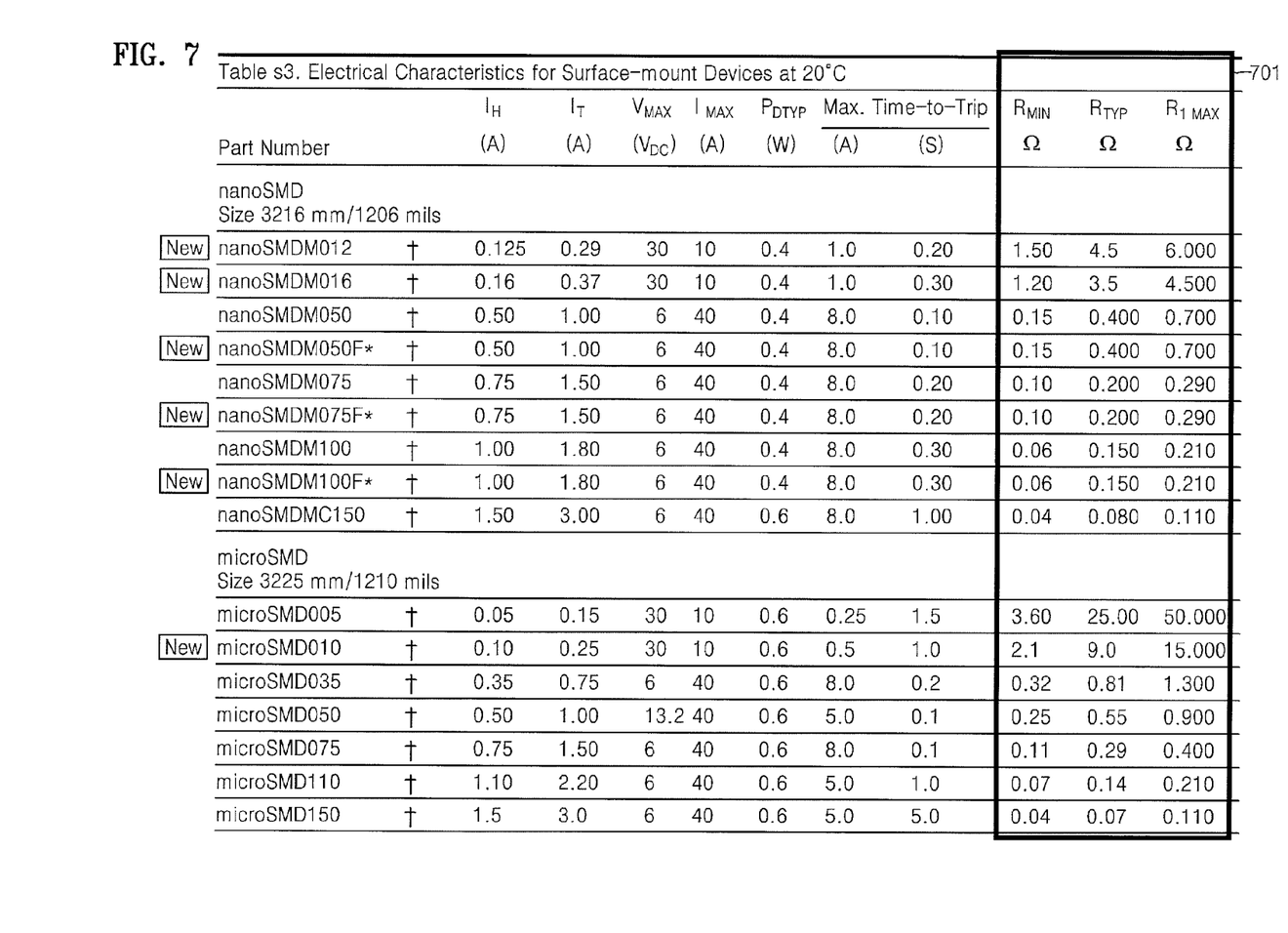
FIG. 7 is a table listing specifications of various poly switches according to one or more embodiments.
Figure 8:
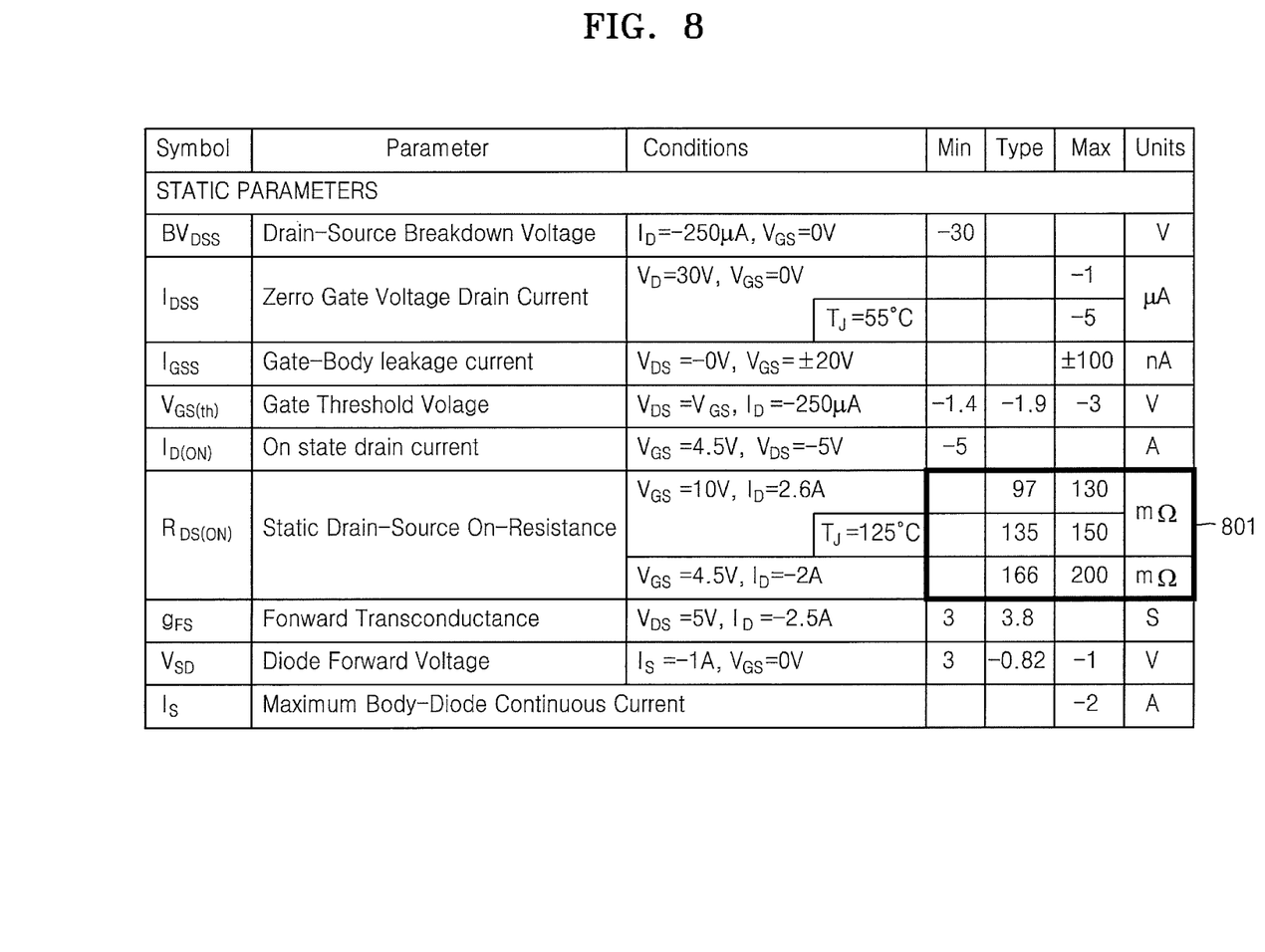
FIG. 8 is a table listing specifications of various switching transistors.

A poly switch or a switching transistor, etc. may be used as R1 provided on the VBUS line. FIG. 7 is a table listing specifications of various poly switches, and FIG. 8 is a table listing specifications of various switching transistors. The minimum resistance value, the representative resistance value and the maximum resistance value when the poly switch and the switching transistor are used as R1 are displayed in an area 701 surrounded by a thick line in FIG. 7 and an area 801 surrounded by a thick line in FIG. 8, respectively.

Figure 3:
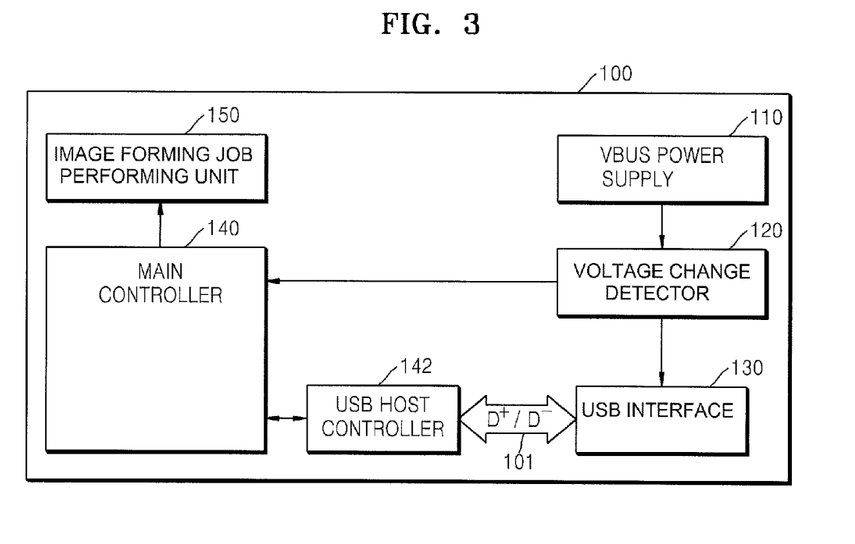
FIG. 3 is a view illustrating an internal configuration of an image forming apparatus according to one or more embodiments.

FIG. 3 illustrates internal components of an image forming apparatus according to one or more embodiments. FIG. 3 is different from FIG. 1 in that the image forming apparatus illustrated in FIG. 3 may have a USB host controller 142 outside the main controller 140. As illustrated in FIG. 3, the USB host controller 142 may be provided in the form of an integrated chip (IC) outside the main controller 140. At this time, separate power that is different from the power supplied to the main controller 140 may be supplied to the USB host controller. If the image forming apparatus 100 enters the power save mode, the main controller 140 may save standby power by blocking the power supplied to the USB host controller 142. Furthermore, if a wake-up signal is received from the voltage change detector 120, the main controller 140 may resume the power supply to the USB host controller 142.

Furthermore, as illustrated in FIG. 3, if the USB host controller 142 is provided outside the main controller 140, the USB host controller 142 and the main controller 140 may transmit and receive data through a local bus, and the USB host controller 142 may perform data transmission and reception through the USB data line 101 and the USB device connected to the USB interface 130.

Figure 4:
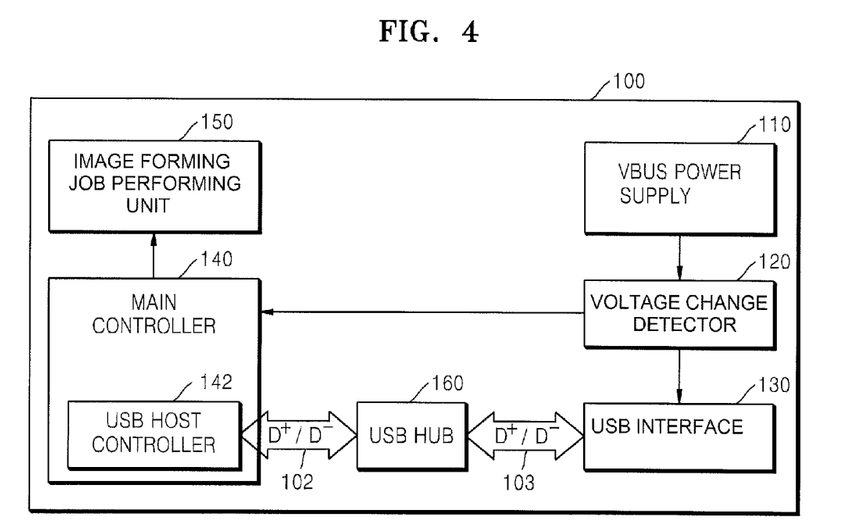
FIG. 4 is a view illustrating an internal configuration of an image forming apparatus according to one or more embodiments.

FIG. 4 is a view illustrating an internal configuration of an image forming apparatus according to one or more embodiments. FIG. 4 is different from FIG. 1 in that the image forming apparatus illustrated in FIG. 4 may further include a USB hub 160. The USB host controller 142 that may be included in the main controller 140 may perform data transmission and reception through the USB data line 102 and the USB hub 160 provided outside the main controller 140, and the USB hub 160 may perform data transmission and reception through the USB data line 103 and the USB device connected to the USB interface 130.

At this time, separate power that may be different from the power supplied to the main controller 140 may be supplied to the USB hub 160. If the image forming apparatus 100 enters the power save mode, the main controller 140 may save standby power by blocking power supplied to the USB hub 160. Furthermore, if a wake-up signal is received from the voltage change detector 120, the main controller 140 may resume the voltage supply to the USB hub 160.

Figure 5:
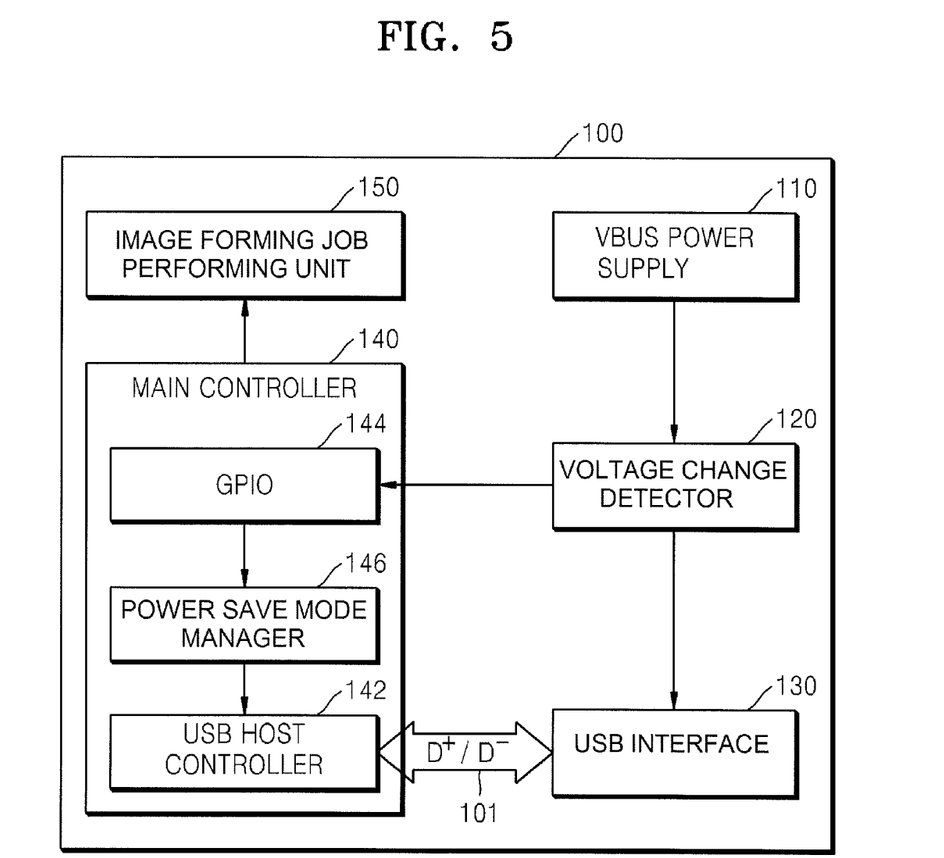
FIG. 5 is a view illustrating an internal configuration of an image forming apparatus according to one or more embodiments.

FIG. 5 is a view illustrating an internal configuration of an image forming apparatus according to one or more embodiments. FIG. 5 is different from FIG. 1 in that the main controller 140 of the image forming apparatus illustrated in FIG. 5 may further include a general purpose input output (GPIO) 144 and a power save mode manager 146. The GPIO 144 is a component for managing input and output of signals, and the main controller 140 may receive a wake-up signal from the voltage change detector 120 through the GPIO 144. If a wake-up signal is received, the GPIO 144 may transmit the received signal to the power save mode manager 146.

The power save mode manager 146 may manage turning on and off each component of the image forming apparatus in a power save mode. The power save mode manager 146 may be, for example, a micro kernel that may be executed by a program stored in a read only memory (ROM) included in the main controller 140. The power save mode manager 146 does not consume much power and thus may always maintain an on state even in a power save mode. Furthermore, the power save mode manager 146 may turn on a configuration corresponding to an event such as reception of a wake-up signal.

Figure 6:
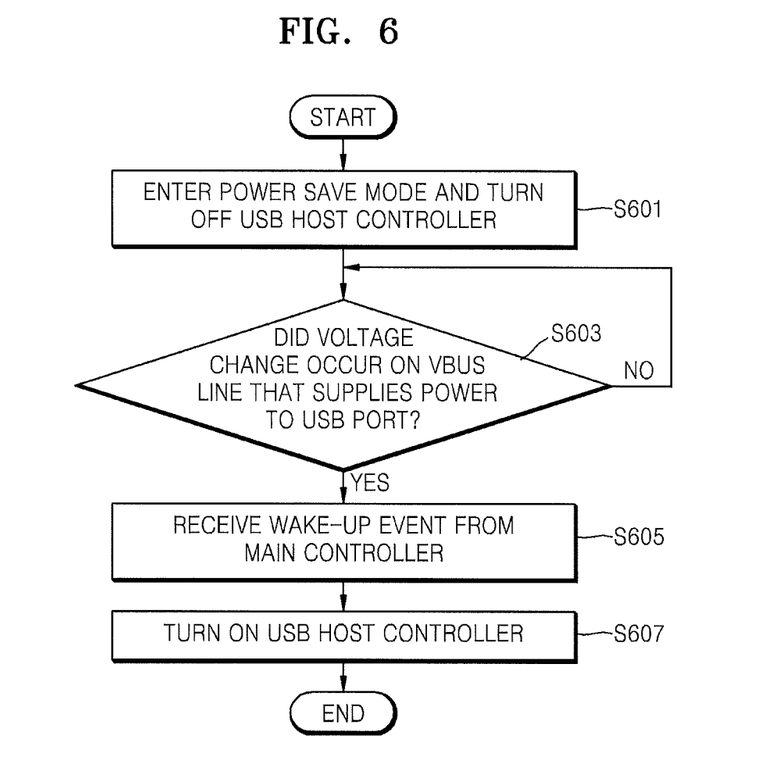
FIG. 6 is a flowchart illustrating a method of sensing connection of a USB device by an image forming apparatus in a power save mode, according to one or more embodiments.

FIG. 6 is a flowchart illustrating a method of sensing connection of a USB device by an image forming apparatus in a power save mode, according to one or more embodiments.

Referring to FIG. 6, in operation S601, the image forming apparatus may enter a power save mode, and may turn off the USB host controller included in the image forming apparatus. Furthermore, in operation S603, it may be determined whether a voltage change has occurred on the VBUS line that supplies power to the USB port of the image forming apparatus. As a result of the determination in operation S603, if it is determined that a voltage change has not occurred, this implies that the USB device has not been connected to the image forming apparatus, and thus the USB host controller may be maintained in an off state.

On the other hand, as a result of the determination in operation S603, if it is determined that a voltage change has occurred, the main controller may receive a wake-up signal in operation S605 and the USB host controller may be turned on in operation S607 so that the USB host controller may transmit and receive data with the USB data connected to the USB port of the image forming apparatus.

As described above, according to one or more embodiments, if an image forming apparatus enters a power save mode, a USB host controller may be turned off, and if a USB device is connected to the image forming apparatus and a voltage change occurs in a VBUS line for supplying power to a USB interface, the change may be detected and the USB host controller may be turned on.

Hence, the off state of the USB host controller may be maintained while the image forming apparatus is in a power save mode, and when there is a connection of a USB device, the connection may be sensed to turn on the USB host controller, thereby possibly saving the standby power.

Furthermore, according to one or more embodiments, a resistor may be provided on a VBUS line for supplying power to the USB interface, and connection of a USB device may be sensed through a configuration such as a comparator for outputting a voltage difference between both ends of the resistor.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image forming apparatus comprising:
   a main controller;
   a universal serial bus (USB) interface;
   a voltage bus (VBUS) power supply to supply power to the USB interface through a VBUS line;
   a voltage change detector to output a wake-up signal to the main controller if a voltage change occurs on the VBUS line;
   a USB host controller to perform data communication with a USB device connected through the USB interface; and
   an image forming job performing unit to perform an image forming job according to control by the main controller,
   wherein the main controller turns off the USB host controller when the image forming apparatus enters a power save mode, and the main controller turns on the USB host controller when the wake-up signal is output by the voltage change detector.

2. The image forming apparatus of claim 1, wherein the voltage change detector comprises:
   a resistor on the VBUS line; and
   a comparator for outputting the wake-up signal if a voltage difference occurs between a first end and a second end of the resistor.

3. The image forming apparatus of claim 2, wherein a voltage value of the first end of the resistor is input to a non-inverting input port of the comparator, and a voltage value of the second end of the resistor is input to an inverting input port of the comparator.

4. The image forming apparatus of claim 2, wherein the resistor is implemented as a poly switch or a switching transistor.

5. The image forming apparatus of claim 1, wherein the main controller comprises:
   a general purpose input/output (GPIO) to manage an input and output of a signal; and
   a power save mode manager to manage a power supply when the image forming apparatus is in a power save mode,
   wherein the power save mode manager turns off the USB host controller when the image forming apparatus enters the power save mode, and turns on the USB host controller when the wake-up signal is received through the GPIO.

6. The image forming apparatus of claim 5, wherein the power save mode manager is a micro kernel operated when the image forming apparatus is in the power save mode.

7. The image forming apparatus of claim 1, wherein the USB host controller is located in the main controller.

8. The image forming apparatus of claim 7, further comprising:
   a USB hub to perform data communication with the USB host controller, wherein the USB hub is located outside the main controller,
   wherein the main controller blocks power supplied to the USB hub when the image forming apparatus enters the power save mode.

9. The image forming apparatus of claim 1, wherein the USB host controller is located outside the main controller, and the main controller blocks power supplied to the USB controller when the image forming apparatus enters the power save mode.

10. The image forming apparatus of claim 1, wherein the main controller further turns off the image forming job performing unit.

11. A method of sensing connection of a universal serial bus (USB) device when an image forming apparatus is in a power save mode, the method comprising:
   turning off a USB host controller of the image forming apparatus when the image forming apparatus enters the power save mode;
   outputting a wake-up signal to a main controller of the image forming apparatus when a USB device is connected to a USB port of the image forming apparatus and a voltage change occurs on a voltage bus (VBUS) line that supplies power to the USB port;
   receiving the wake-up signal by the main controller; and
   turning on the USB host controller by the main controller.

12. The method of claim 11, wherein the outputting of the wake-up signal amplifies a voltage difference between first and second ends of a resistor on the VBUS line, and outputs the amplified voltage difference.

13. The method of claim 12, wherein the resistor is implemented as a poly switch or a switching transistor.

14. The method of claim 11, wherein the main controller operates a micro kernel if the image forming apparatus enters the power save mode,
   wherein the receiving of the wake-up signal comprises receiving the wake-up signal through a general purpose input/output (GPIO) of the main controller; and
   wherein the turning on of the USB host controller turns on the USB host controller when the micro kernel receives the wake-up signal from the GPIO.

15. A non-transitory computer-readable recording medium having recorded thereon a program for executing the method of claim 11 in a computer.

16. An image forming apparatus comprising:
   a main controller;
   an external device interface;
   a power supply to supply power to the external device interface through a power supply line;
   a voltage change detector to output a wake-up signal to the main controller if a voltage change occurs on the power supply line;
   wherein the main controller turns off one or more components of the image forming apparatus when the image forming apparatus enters a power save mode, and the main controller turns on one or more components of the image forming apparatus when the wake-up signal is output by the voltage change detector.

17. The image forming apparatus of claim 16, wherein the power supply is a voltage bus (VBUS) power supply an power is supplied to the external device interface through a VBUS line.

18. The image forming apparatus of claim 17, wherein the voltage change detector comprises:
   a resistor on the VBUS line; and
   a comparator for outputting the wake-up signal if a voltage difference occurs between a first end and a second end of the resistor.

19. The image forming apparatus of claim 18, wherein a voltage value of the first end of the resistor is input to a non-inverting input port of the comparator, and a voltage value of the second end of the resistor is input to an inverting input port of the comparator.

20. The image forming apparatus of claim 18, wherein the resistor is implemented as a poly switch or a switching transistor.

21. The image forming apparatus of claim 16, wherein the external device interface is a universal serial bus (USB) interface.

* * * * *

UNITED STATES PATENT AND TRADEMARK OFFICE
CERTIFICATE OF CORRECTION

PATENT NO. : 8,928,907 B2
APPLICATION NO. : 13/938390
DATED : January 6, 2015
INVENTOR(S) : Byung-sun Min et al.

It is certified that error appears in the above-identified patent and that said Letters Patent is hereby corrected as shown below:

Claims

Claim 17, Column 10, Line 34

Delete "an" and insert --and--, therefor.

Signed and Sealed this
Thirteenth Day of October, 2015

Michelle K. Lee
*Director of the United States Patent and Trademark Office*